(12) United States Patent
Suzuki

(10) Patent No.: US 8,682,155 B2
(45) Date of Patent: Mar. 25, 2014

(54) IMAGE PICKUP APPARATUS

(75) Inventor: Yasuyuki Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 13/369,718

(22) Filed: Feb. 9, 2012

(65) Prior Publication Data

US 2012/0219278 A1    Aug. 30, 2012

(30) Foreign Application Priority Data

Feb. 24, 2011   (JP) ................. 2011-038560

(51) Int. Cl.
*G03B 15/16*   (2006.01)
*H04N 5/228*   (2006.01)

(52) U.S. Cl.
USPC ............ 396/95; 396/52; 396/153; 348/208.2; 348/208.3; 348/208.14

(58) Field of Classification Search
USPC ......... 396/95, 55, 80, 104, 123, 147, 52, 153; 348/208.2, 208.3, 208.14
See application file for complete search history.

(56) References Cited

U.S. PATENT DOCUMENTS 6,081,668 A * 6/2000 Furuyama et al. .............. 396/55
6,157,780 A * 12/2000 Hamada et al. ................. 396/55

FOREIGN PATENT DOCUMENTS

JP       9105970 A    4/1997
JP      11326743 A    11/1999

* cited by examiner

*Primary Examiner* — Rochelle-Ann J Blackman
(74) *Attorney, Agent, or Firm* — Canon USA Inc. IP Division

(57) ABSTRACT

An image pickup apparatus which changes focal point adjustment by a focal point adjusting unit in accordance with the panning state detected by a panning detecting unit and a focal point state detected by a focal point detecting unit.

9 Claims, 10 Drawing Sheets

IMAGE PICKUP APPARATUS

BACKGROUND OF THE INVENTION

1. Field of the Invention

The present invention relates to an image pickup apparatus, such as a single-lens reflex (SLR) camera, equipped with a focal point adjusting unit.

2. Description of the Related Art

Hitherto, a control method has been widely known which drives an imaging lens simultaneously with the movement of a subject in order to keep the moving subject in focus for a camera having a focal point adjusting unit.

A photographer performs the focal point adjustment by capturing (including) a subject in a focal-point detection area arranged on a photographing screen (viewed on a viewfinder). Focal point adjustment is beneficial in keeping the subject focused when photographing a moving subject, by implementing panning photography. As generally understood by persons of ordinary skill in the art, panning refers to the rotation in a predetermined plane of a still or video camera to track in time a moving subject. In still photography, panning is used to suggest fast motion. That is, photographic pictures are usually noted by a foreground subject in action appearing still (e.g., a runner frozen in mid-stride) while the background is streaked and/or skewed in the apparently opposite direction of the subject's travel. In video display technology, panning refers to the horizontal scrolling of an image that is wider than the display.

However, when a photographer implements panning photography, capturing a subject into the focal-point detection area is not easy. A condition that the photographer may not track the subject may often occur. Under the condition, when a focal point detecting operation and a focal point adjusting operation are performed, the main subject actually desired to be photographed may not come into focus while an object that is not the main subject may come into focus.

Previous attempts to solve the above problem have been proposed. Japanese Patent Application Laid-Open No. 09-105970 discloses means for using a shake detecting unit which detects a camera shake and, if the camera shake may not be fully corrected even by shake correcting means having a displaceable optical element provided in an optical system, preventing a focal point adjusting operation.

Japanese Patent Application Laid-Open No. 11-326743 discloses means for using a shake detecting unit which detects a shake of a camera to detect a shake at a speed or acceleration of a predetermined value or higher, determining that there is a high possibility that the photographer may not track a subject if detected, and preventing a focal point adjusting operation.

However, according to the prior arts disclosed in Japanese Patent Application Laid-Open Nos. 09-105970 and 11-326743, when a photographer is panning with excessively sharp movements or for prolonged periods of time, a subject may not be kept within the focal point detection area. More specifically, even when a photographer securely captures a main subject in a focal-point detection area, the focal point adjusting operation using a detection result by the focal point detecting unit is not performed if the amount of shake of a camera is equal to or higher than a predetermined value. As a result, an image may be obtained in which the main subject is not in focus.

SUMMARY OF THE INVENTION

According to at least one aspect of the present invention, it is disclosed herein an image pickup apparatus capable of implementing focal point adjustment on a main subject if it is determined that a focal-point detection area has a main subject even when the amount of shake caused by panning is equal to or higher than a predetermined value.

In accordance, with at least one embodiment, the present invention provides an image pickup apparatus including a focal point detecting unit which detects a focal point state of an imaging lens, an adjusting unit which performs a focal point adjustment operation on the imaging lens in accordance with the focal point state, a panning detecting unit which detects a panning state of the imaging lens or the image pickup apparatus, and a controller which changes the focal point adjustment operation by the adjusting unit in accordance with the panning state detected by the panning detecting unit and the focal point state detected by the focal point detecting unit.

Further features of the present invention will become apparent from the following description of exemplary embodiments with reference to the attached drawings.

DESCRIPTION OF THE EMBODIMENTS

Figure 1:
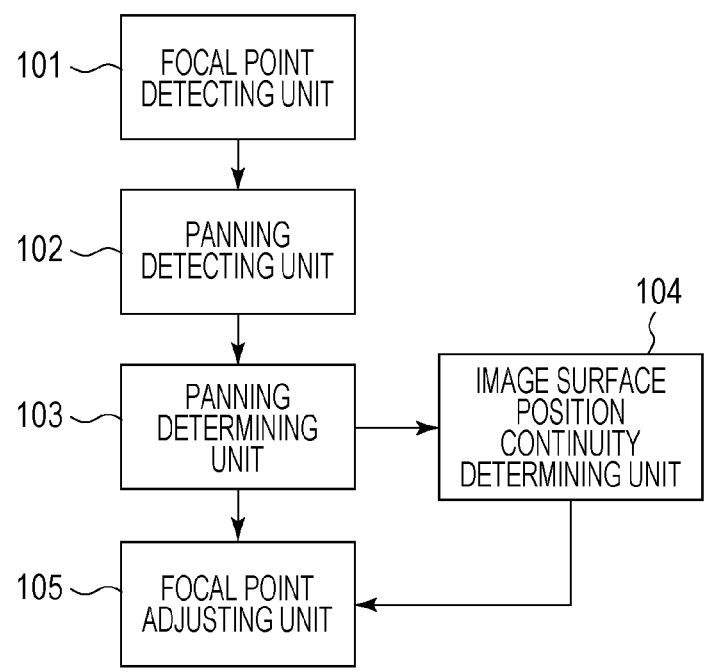
FIG. 1 is a block diagram illustrating conceptual functional blocks of an image pickup apparatus according to an embodiment of the present invention.

Preferred embodiments of the present invention will now be described in detail with reference to the accompanying drawings, where like reference numerals refer to like parts.

FIG. 1 is a block diagram illustrating conceptual functional blocks of an image pickup apparatus according to an embodiment of the present invention. An image pickup apparatus in FIG. 1 includes a focal point detecting unit 101, a focal point adjusting unit 105, a panning detecting unit 102, a panning determining unit 103, and an image-surface position continuity determining unit 104. The focal point detecting unit 101 detects a focal point state of an imaging lens 201 (in FIG. 2); that is, the focal point detecting unit 101 detects a focus state (e.g., the amount of defocus) of the imaging lens. The focal point adjusting unit 105 performs focal point adjustment on the imaging lens in accordance with the detected focal point state of the imaging lens; that is, the focal point adjusting unit 105 controls adjustment of the amount of defocus. The panning detecting unit 102 detects panning of a lens or camera with a gyrosensor (angular rate sensor). The panning determining unit 103 determines the panning state for a predetermined period of time (such as is) detected by the panning detecting unit 102. The image-surface position continuity determining unit 104 determines whether the image surface positions acquired by the focal point detecting unit 101 a plurality of number of times in the past have continuity or not if the panning determining unit 103 determines that the panning state continues for a predetermined period of time or longer. As used herein, the term "continuity" may generally indicate a substantially consistent and essentially uninterrupted operation of something over a period of time. In mathematical terms, for example, the continuity of a function may be understood as being not discrete. For example, for a function f(x) defined on an interval around a, the function f(x) is continuous if Equation (1) is true, otherwise f(x) is discontinuous at a.

$$\lim_{x \to a} f(x) = f(a) \qquad \text{Equation (1)}$$

In Equation (1) the continuity of f(x) at a means the limit of f(x) at a exists, and that this limit is f(a). Accordingly, in the present description, if it is determined that the image surface positions have continuity, the focal point adjusting unit 105 performs focal point adjustment. If not, the focal point adjusting unit 105 stops the focal point adjustment.

Figure 2:
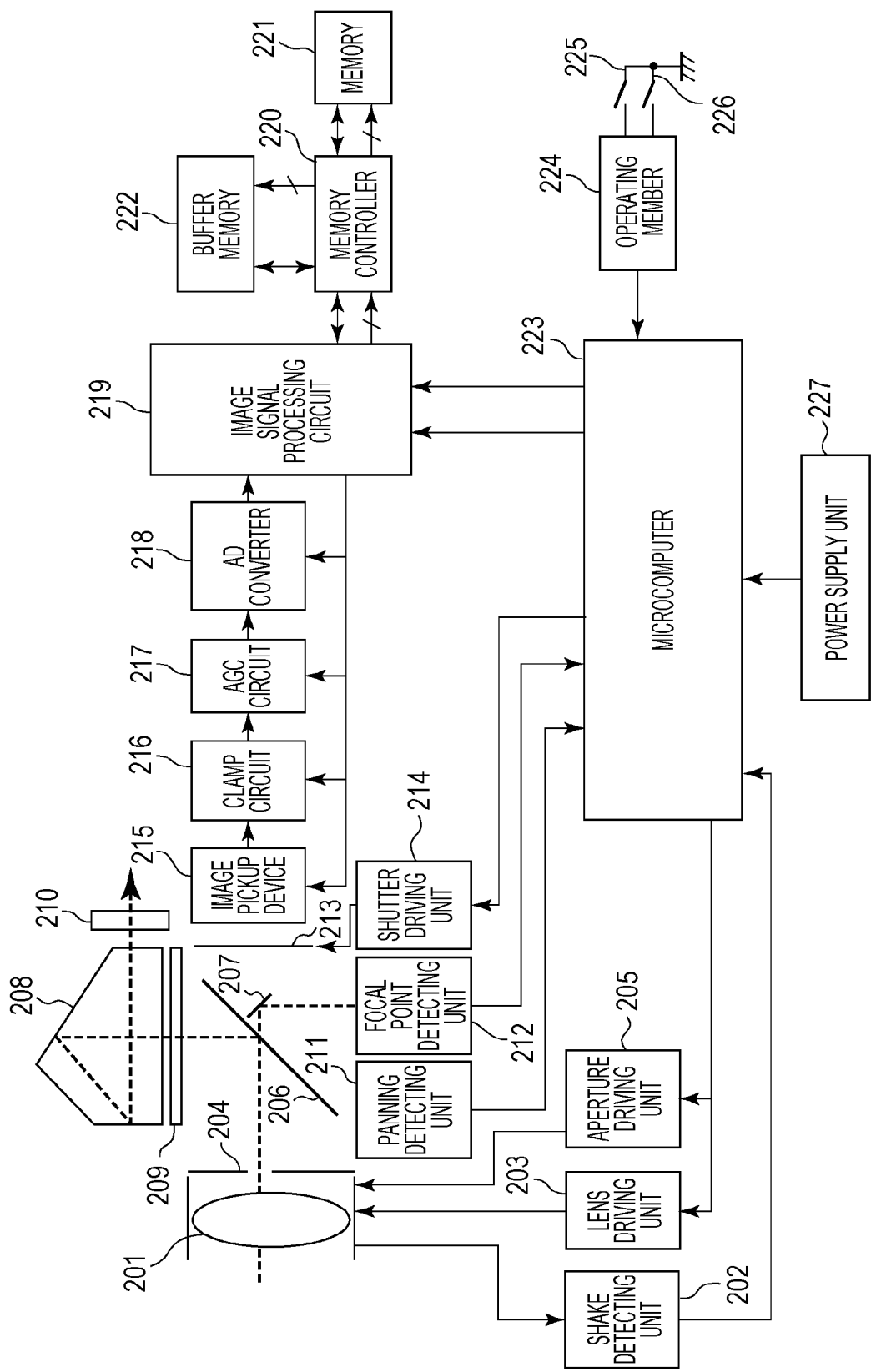
FIG. 2 is a block diagram illustrating an exemplary configuration of a single-lens reflex camera that is an embodiment of the present invention.

Next, a single-lens reflex camera will be described which is an example of an image pickup apparatus according to an embodiment of the present invention. FIG. 2 is a block diagram illustrating a configuration of a single-lens reflex camera.

The single-lens reflex camera includes an imaging lens 201 and a shake detecting unit 202 which is provided within a lens and detects a shake state. More specifically, the shake detecting unit 202 may be implemented by a gyrosensor (angular rate sensor) configured to detect the angular momentum of rotation. The shake detecting unit 202 may generally be used for correcting a shake of a lens. According to this embodiment, the shake detecting unit 202 also functions as a panning detecting unit which detects a panning state of a lens.

The single-lens reflex camera further includes a lens driving unit 203. The lens driving unit 203 may be configured by a DC motor or an ultrasound motor, for example, and changes the focus lens position of the imaging lens 201 under the control of a microcomputer 223 (microprocessor) for focusing.

The single-lens reflex camera further includes an aperture 204 and an aperture driving unit 205. The aperture driving unit 205 drives the aperture 204. The amount to be driven is calculated by the microcomputer 223 and changes the optical aperture value.

The single-lens reflex camera further includes a main mirror 206 which switches a light beam entering through the imaging lens 201 between a viewfinder side and an image pickup element side. The main mirror 206 is arranged so as to reflect the light beam to guide it to the viewfinder side at all times. However, during a photographing operation, the main mirror 206 moves upward to guide a light beam toward the image pickup element 215 and is retracted from the light beam. The main mirror 206 is a half mirror that allows part of the light incident thereupon to pass through it at its center even when the main mirror 206 is not retracted. The single-lens reflex camera further includes a sub-mirror 207 which reflects the light passed through the main mirror 206 and guides the reflected light beam toward a pair of AF sensors (provided within a focal point detecting unit 212) for focal point detection.

The single-lens reflex camera further includes a pentaprism 208 included in a viewfinder. The viewfinder further includes a focusing screen 209, an eyepiece 210 and so on.

The single-lens reflex camera further includes a panning detecting unit 211 which detects a panning state of a camera; the panning detecting unit may be implemented by a gyrosensor (angular rate sensor).

The single-lens reflex camera further includes a focal point detecting unit 212. The light beam passed through the center of the main mirror 206 and reflected by the sub-mirror 207 reaches the pair of AF sensors provided within the focal point detecting unit 212 for photoelectric conversion. The amount of defocus exhibiting the focal point state of the imaging lens 201 with respect to a subject is acquired by calculating the output of the pair of AF sensors. The microcomputer 223 evaluates the calculation result and instructs the lens driving unit 203 to drive the focus lens of the imaging lens 201.

The single-lens reflex camera further includes a curtain shutter 213 and a shutter driving unit 214 which drives the curtain shutter 213. The aperture time of the shutter is controlled by the microcomputer 223.

The single-lens reflex camera further includes an image pickup element 215. The image pickup element 215 may be a CCD or a CMOS sensor, for example, and converts a subject image formed by the imaging lens 201 to an electric signal.

The single-lens reflex camera further includes a clamp circuit 216 and an AGC circuit 217. The clamp circuit 216 and AGC circuit 217 perform fundamental analog signal processing before A/D conversion, and the microcomputer 223 changes the clamp level and/or AGC reference level. The single-lens reflex camera further includes an A/D converter 218. The A/D converter 218 converts the analog output signal in the image pickup element 215 to a digital signal.

The single-lens reflex camera further includes an image signal processing circuit 219 which may be implemented by a logic device such as a gate array, a memory controller 220, a memory 221, and a buffer memory 222 (temporary storage). The image signal processing circuit 219 performs filter processing, color conversion processing, gamma processing on digitized image data and compression processing such as JPEG and outputs the result to the memory controller 220.

The image signal processing circuit 219 may output exposure information, white balance information and so on of a signal in the image pickup element 215 to the microcomputer 223 as required. On the basis of that information, the microcomputer 223 controls white balance and/or gain adjustment. In a serial shooting operation, photograph data of unprocessed image is stored in the buffer memory 222 once, and the unprocessed image data is read through the memory controller 220. Then, the image signal processing circuit 219 performs image processing and/or compression processing for serial shooting. The number of serial shots may depend on the capacity of the buffer memory 222.

The memory controller 220 stores the unprocessed digital image data input from the image signal processing circuit 219 in the buffer memory 222, and stores processed digital image data in the memory 221. Conversely, image data are output from the buffer memory 222 and/or memory 221 to the image signal processing circuit 219. The memory 221 may be removable.

The single-lens reflex camera further includes a manipulating member (operating member) 224 operatively connected to the microcomputer 223. The manipulating member 224 notifies the microcomputer 223 of its state (e.g., position), and the microcomputer 223 controls the corresponding component in accordance with a change in the state of the manipulating member 224. The manipulating member 224 may perform an operation of shifting a camera to a ONE SHOT mode suitable for photographing a still subject, an AI-SERVO mode suitable for photographing a subject the distance to which continuously changes, and an AI-FOCUS mode for automatically shifting a camera from ONE SHOT to AI-SERVO in accordance with the state of a subject.

The single-lens reflex camera further includes a switch SW1 225 and a switch SW2 226. The switch SW1 and switch SW2 are turned on and off in accordance with operations on a release button and are included in input switches of the manipulating member 224. When only the switch SW1 has an ON state, the release button has a half press state. In this state, an auto-focus operation or a photometry operation may be performed. When both of the switches SW1 and SW2 have an ON state, the release button has a full press state. Which is a release button ON state for recording an image. Photographing is performed at this state. When the switches SW1 and SW2 keep the ON state, serial shooting operation is performed. Other switches, not illustrated, are connected to the manipulating member 224, such as an ISO setting button, an image size setting button, an image quality setting button, and an information display button, and the states of the switches are detected.

The single-lens reflex camera further includes a power supply unit 227. The power supply unit 227 supplies power for ICs and driving units.

Figure 3A:
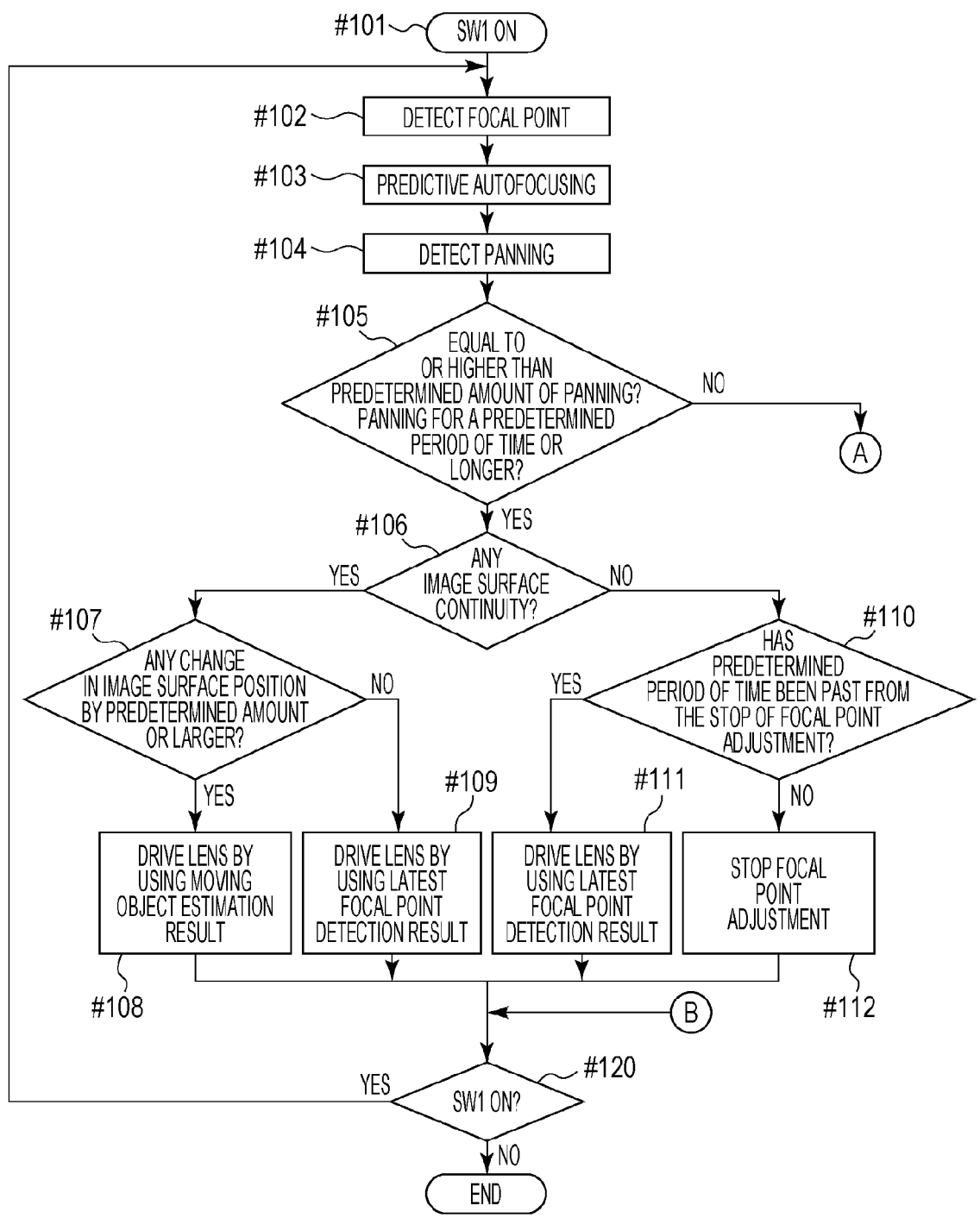
FIGS. 3A and 3B are flowcharts exemplifying a flow process of an automatic focal point adjusting operation according to an embodiment of the present invention.
Figure 3B:
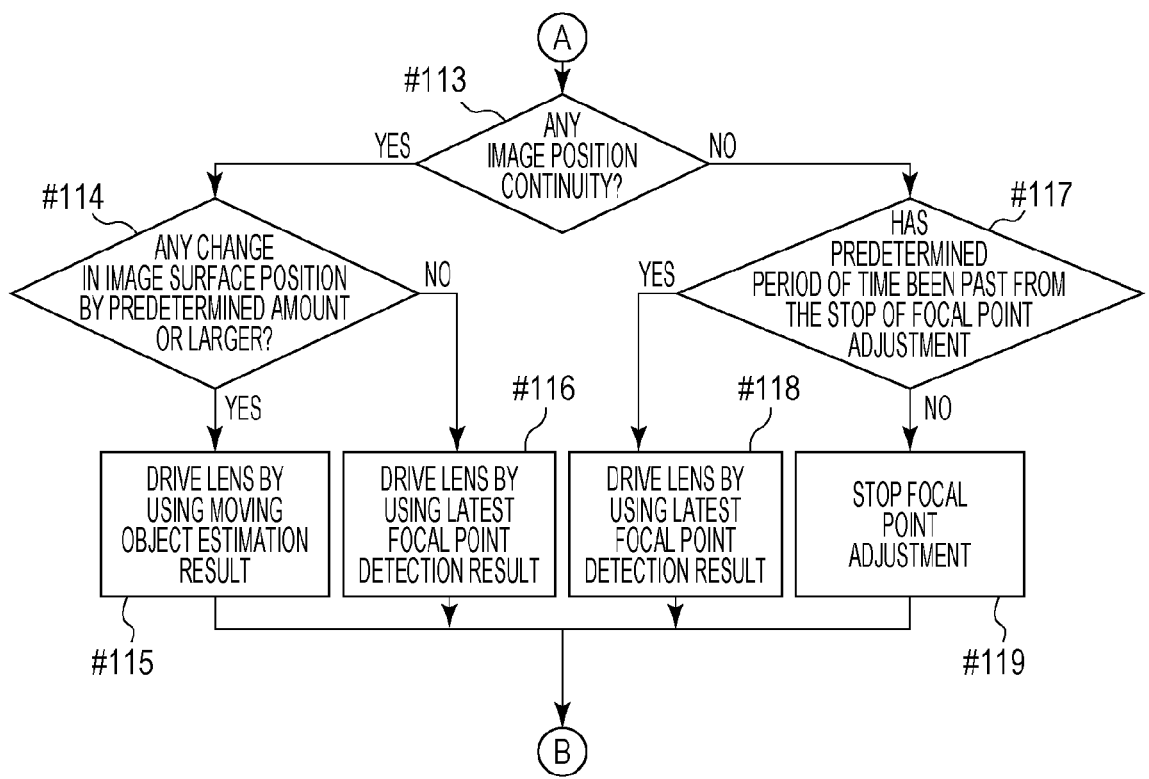

Next, an automatic focal point adjusting operation will be described with reference to the flowchart in FIGS. 3A and 3B. When the switch SW1 is turned on in step #101, an automatic focal point adjusting operation starts. In step #102, a focal point is first detected, and the amount of defocus is detected from a subject signal. After the detection of the amount of defocus ends, predictive autofocusing is performed in the next step #103. The predictive autofocusing refers to a method which uses a plurality of past image surface positions of a subject and their detection times to acquire a future image surface position of the subject by performing a statistical operation.

By using a regression curve matching the plurality of past image surface positions and the detection times statistically as functions as a prediction expression, the image surface position of the subject in consideration of a release time lag is acquired. The prediction expression may be expressed by $y(t)=\alpha+\beta t+\gamma t^2$. This is regarded as a linear regression model where y is an objective variable, and t and $t^2$ are explanatory variables and undergo multiple regression analysis to statistically determine the coefficients of $\alpha$, $\beta$, and $\gamma$ so that the prediction expression may most fits to a set of a past plurality of focal point detection results (image surface positions and their detection times). Next, a time is set to t of the acquired prediction expression in consideration of a release time lag, and a predictive value is acquired. The result of subtraction of the present image surface position of the lens from the predictive value is the amount of lens drive that is finally required.

In the next step #104, the lens-mounted shake detecting unit 202 or camera-mounted panning detecting unit 211 detects the amount of shake of the camera. The output value representing panning of a camera detected in step #104 will be described with reference to FIG. 4A and FIG. 4B.

Figure 4A:
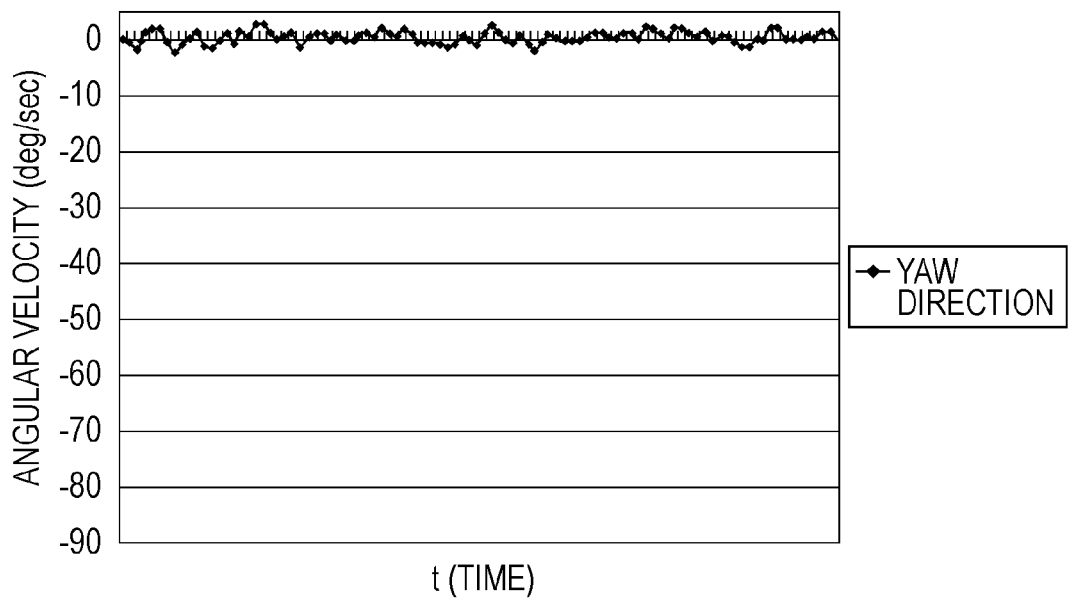
FIGS. 4A and 4B illustrate the amount of shakes in a yaw direction by a panning detecting unit of an exemplary image pickup apparatus.
Figure 6:
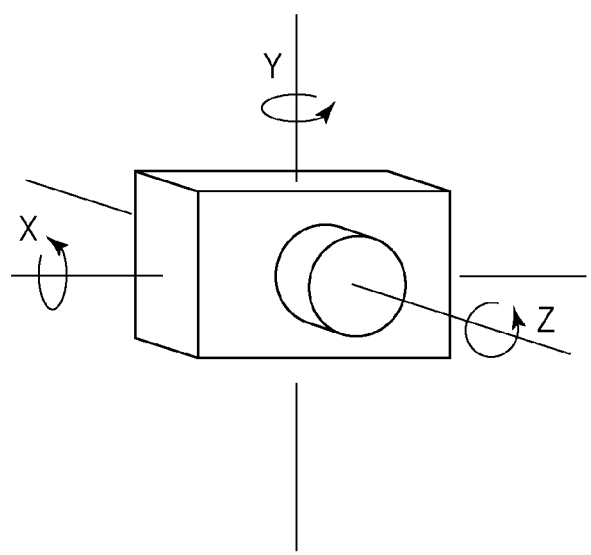
FIG. 6 illustrates a plurality of directions of rotation of a camera as an example of an image pickup apparatus.

FIG. 4A illustrates output results when a photographer holds a camera up by hand to capture a still subject and the panning detecting unit 211 provided in the camera detects the amount of shake of the camera in a yaw direction. The yaw direction refers to a direction in which a camera is rotated about the Y-axis as illustrated in FIG. 6. The amount of camera shake in the yaw direction is mainly the amount detected when the camera is panned. The horizontal axis indicates time, and the vertical axis indicates angular rate (deg/sec). Generally, the output value when a camera is held up by hand to capture a still subject is about −3 to 3 deg/sec. The maximum shake width is about 6 deg/sec.

Figure 4B:
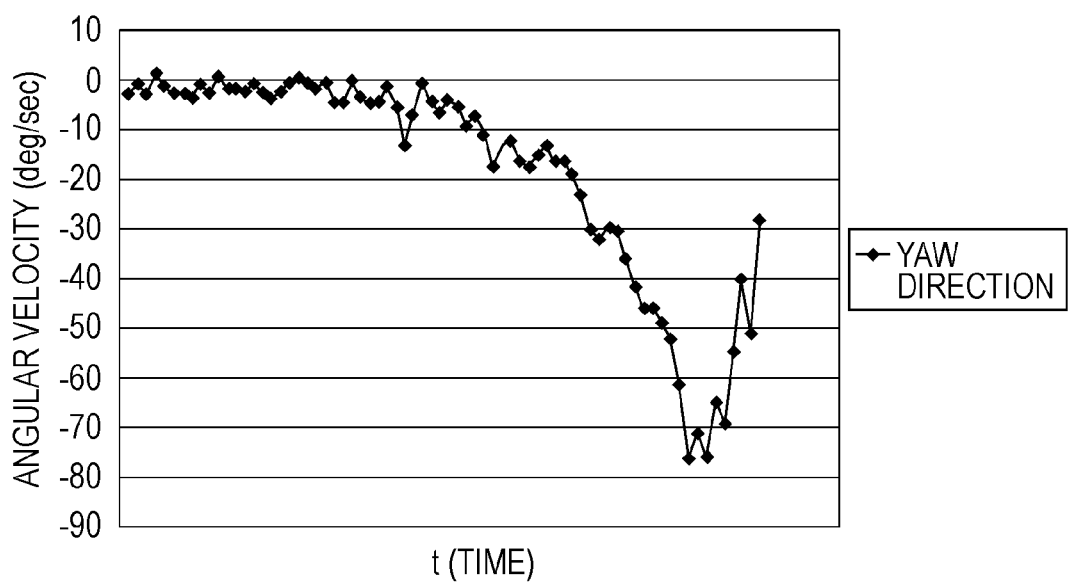

On the other hand, FIG. 4B illustrates output results when a photographer holds a camera up by hand and shakes the lens to capture a moving subject and the panning detecting unit 211 provided in the camera detects the amount of shake of the camera in a yaw direction. The maximum shake width of the output value in this case is about 90, and the output values are higher than those without panning of the camera.

Figure 5A:
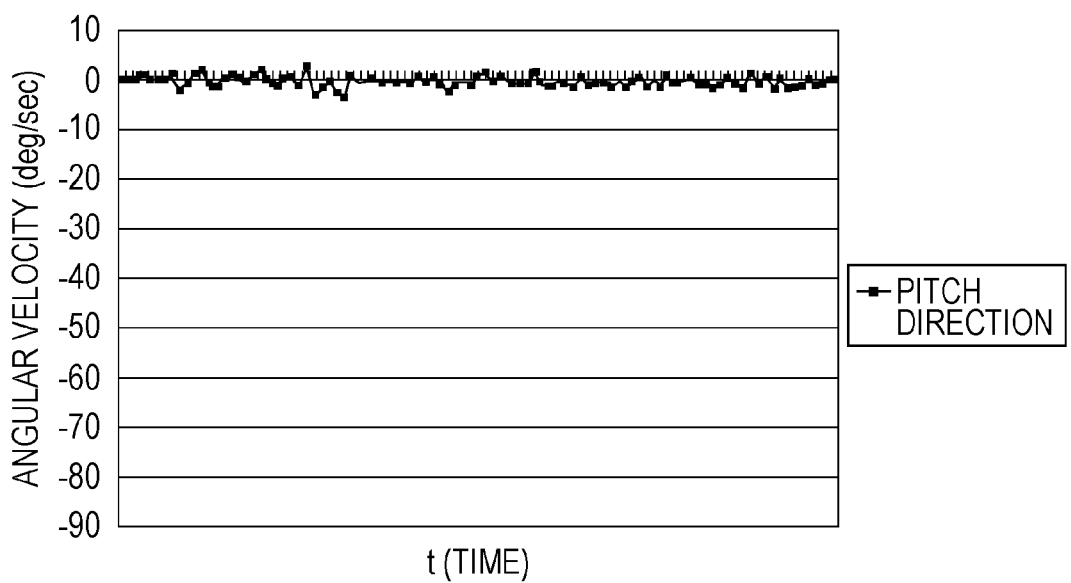
FIG. 5A and FIG. 5B illustrate the amount of shakes in a pitch direction by a panning detecting unit of an exemplary image pickup apparatus.
Figure 5B:
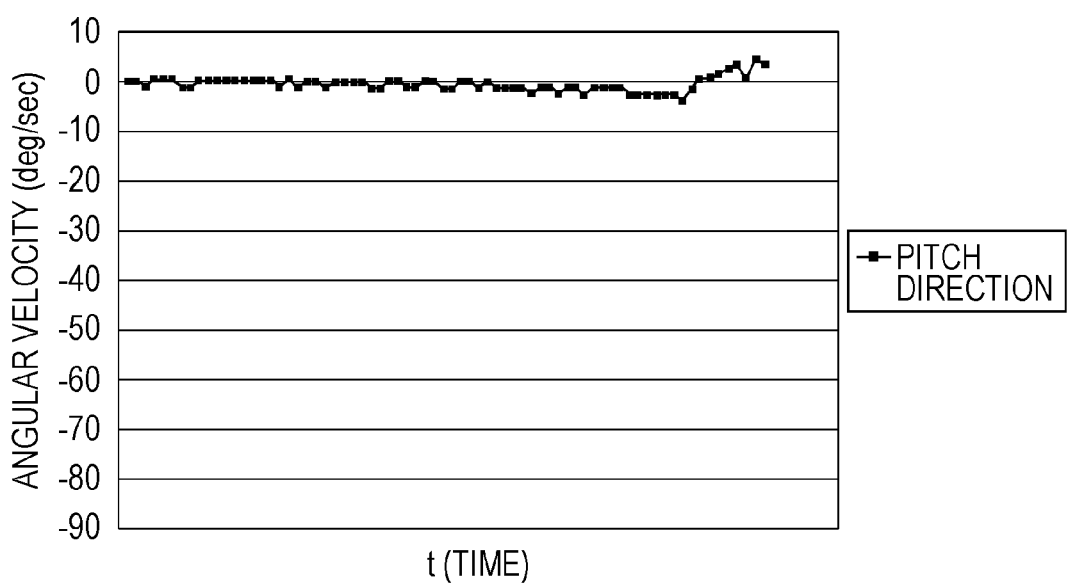

FIG. 5A and FIG. 5B illustrate output results when the panning detecting unit 211 provided within a camera detects the amount of camera shake in a pitch direction. The pitch direction refers to the direction in which a camera is rotated about the X-axis as illustrated in FIG. 6. The amount of camera shake in the pitch direction is lower than the output value in the panning yaw direction. Thus, for panning detection, the amount of detection about the Y-axis may be used when a camera is held at a normal position, and the amount of detection about the X-axis may be used when a camera is turned sideways.

In step #105, whether the camera is being panned or not is determined (hereinafter, called panning determination) in accordance with the panning detection result of the lens or camera detected in step #104. The panning determination determines that the camera is being panned if the amount of panning is equal to or higher than a predetermined amount by which the panning may be determined and the camera is shaken for a predetermined period of time (such as 1s). On the other hand, it is determined that the camera is not being panned if the amount of panning is lower than the predetermined amount by which the panning may be determined and the camera is not shaken for the predetermined period of time (such as 1s).

The panning determination may be implemented also by using the shake detecting unit 202 which detects panning of a lens.

If it is determined in step #105 that panning is being performed (YES), the processing flow advances to step #106. In step #106, whether the image surface positions have continuity or not is determined (hereinafter, called image-surface position continuity determination) on the basis of the image surface positions where the subject having undergone focal point detection in step #102 is observed with the camera over a number of times in the past.

Figure 7:
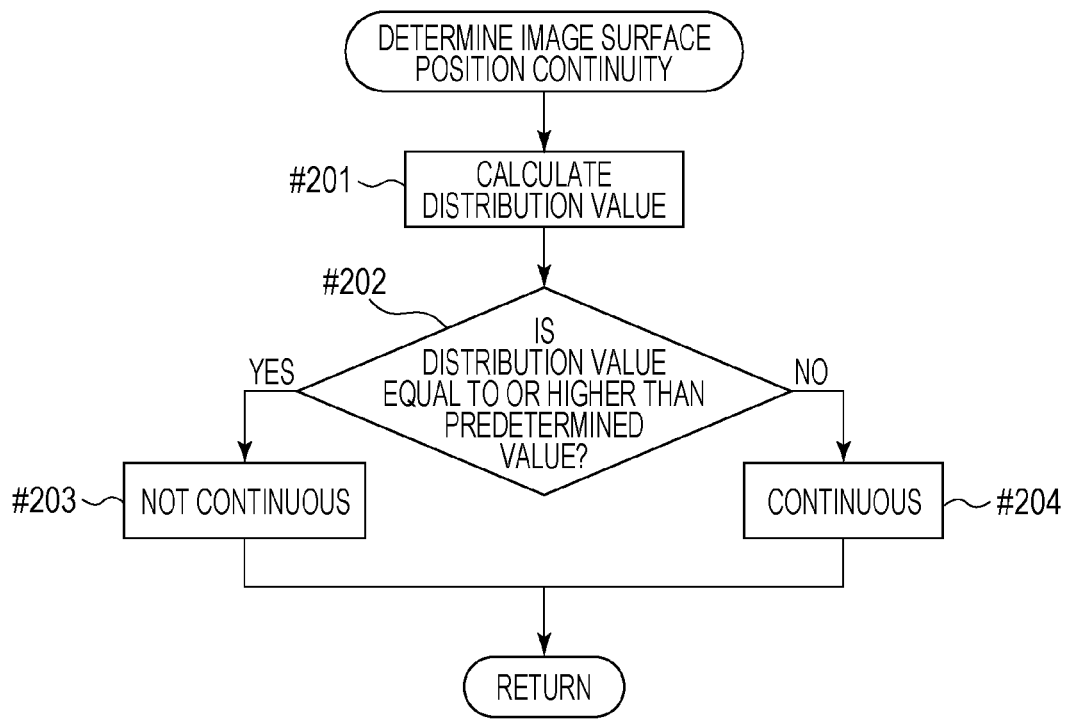
FIG. 7 is a flowchart illustrating exemplary steps of a process used to determine image surface position continuity when dispersion is used.

FIG. 7 is a flowchart when dispersion is used for the image-surface position continuity determination. First of all, a dispersion value is calculated (step #201) which quantatively exhibits how much the prediction expression $y(t)=\alpha+\beta t+\gamma t^2$ acquired in step #103 fits to a set of a plurality of past image surface positions and their detection times. The calculated dispersion value may be used to determine the continuity.

Figure 9A:
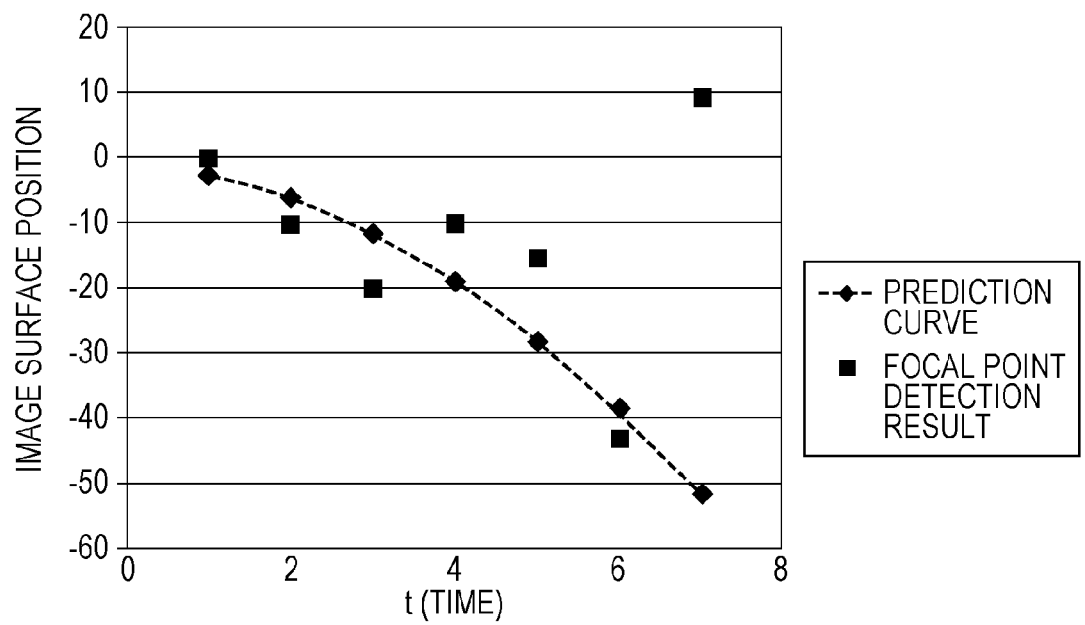
FIGS. 9A and 9B illustrate the magnitudes of dispersion in image-surface position continuity determination.

If the image surface positions where a focal point is detected a plurality of number of times in the past as illustrated in FIG. 9A do not fit well to the prediction curve acquired with the prediction expression, it may be said that the past plurality of focal point detection results are instable. The dispersion value in this case is high. In other words, a higher dispersion value means image surface positions without continuity because the amount of defocus of the focal point detection results is larger as much as the defocus extends to the background or a different subject is being captured.

Figure 9B:
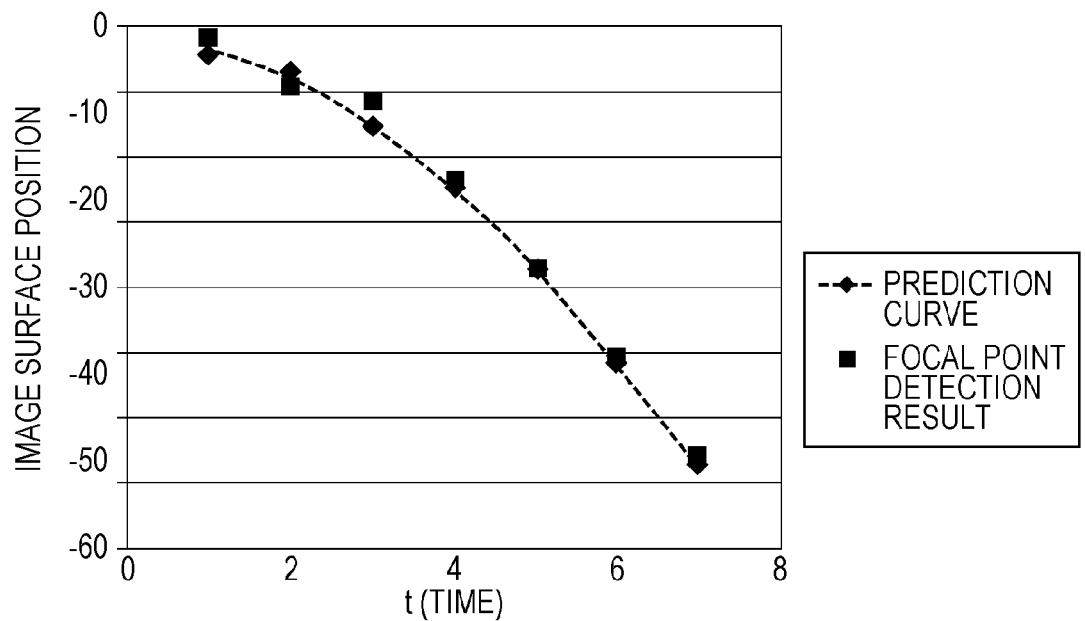

Conversely, if the image surface positions where a focal point is detected a plurality of number of times in the past as illustrated in FIG. 9B fits well to the prediction curve acquired with the prediction expression $y(t)=\alpha+\beta t+\gamma t^2$, it may be said that the past plurality of focal point detection results are stable. The dispersion value in this case is low. In other words, a lower dispersion value means image surface positions with continuity where focal points were detected a plurality of number of times in the past.

Thus, in step #202, the continuity is determined in accordance with whether the dispersion value is equal to or higher than a predetermined value or not. If the dispersion value is equal to or higher than a predetermined value, no continuity is determined (step #203). If the dispersion value is lower than the predetermined value, continuity is determined (step #204).

Figure 8:
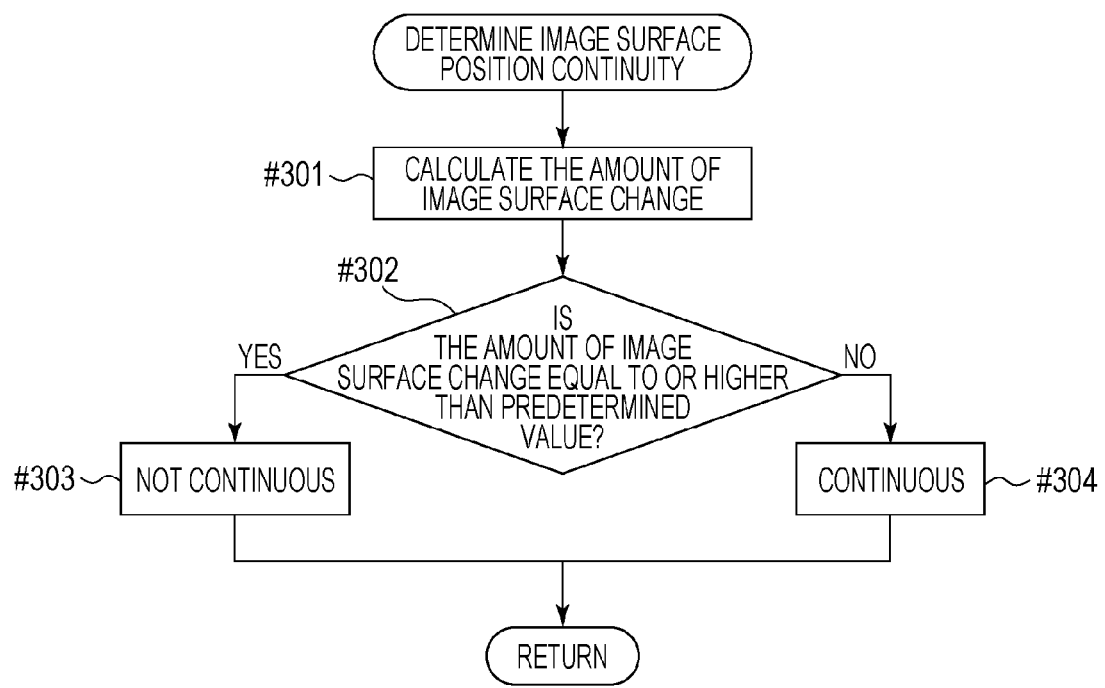
FIG. 8 is a flowchart illustrating exemplary steps of a process used to determine image surface position continuity when the amount of image surface change is used in a calculation thereof.

FIG. 8 is a flowchart when the amount of change in image surface is used for the image-surface position continuity determination. First, in step #301, a predetermined period of time (is) is measured with a self-propelled timer of the microcomputer 223, and the amount of change in image surface in the predetermined period of time is calculated. If the amount of change in image surface in the predetermined period of time acquired in step #302 is lower than the amount of change in image surface (predetermined value) with which it may be determined that the subject is movable within the predetermined period of time, it is determined that the image surface positions have continuity (step #304). On the other hand, if it is equal to or higher than the amount of change in image surface (predetermined value) with which it may be determined that the subject is movable within the predetermined period of time, it is determined that the image surface positions do not have continuity (step #303).

Referring back to FIGS. 3A and 3B, if it is determined in step #106 that the image surface positions have continuity, the processing moves to step #107 where whether the image surface position has changed by a predetermined amount or larger or not is determined to determine whether the subject is moving or not. If the image surface position has changed by a predetermined amount or larger, the processing moves to step #108 where the lens is driven by the amount of drive (predictive autofocusing result) calculated by the statistical operation (predictive autofocusing) in step #103. If not, it is determined that predictive autofocusing is not necessary in step #109, and the lens is driven by the amount of defocus acquired by the focal point detection from the latest focal point detection result.

If it is determined in step #106 that the image surface positions do not have continuity, the processing moves to step #110 where it is determined whether a predetermined period of time has passed (is or longer period of time has passed) from the stop of the focal point adjustment in step #112 or step #119 or not. If so, the processing moves to step #111 where a different subject is determined as the subject to be captured by the photographer, and the lens is driven by the amount of defocus acquired by the focal point detection from the latest focal point detection result. If the predetermined period of time has not passed, the processing moves to step #112 where the focal point adjustment is stopped. The focal point adjustment is stopped in step #112 to determine that a photographer tracking a main subject by panning may not capture the main subject in the focal-point detection area and captures other objects than the main subject within the focal-point detection area, stop the lens, and prevents the lens to track other objects than the main subject.

If it is determined in step #105 that panning is not being performed, the processing moves to step #113 where the continuity of image surface positions is determined. If it is determined in step #113 that the image surface positions have continuity, the processing moves to step #114 where image surface position has changed by a predetermined amount or larger to check whether the subject is moving or not. If so, the processing moves to step #115 where the lens is driven by the amount of drive calculated by the statistical operation in step #103. If not, it is determined that predictive autofocusing is not necessary in step #116, and the lens is driven by the amount of defocus acquired by the focal point detection from the latest focal point detection result.

If it is determined in step #113 that the image surface positions do not have continuity, the processing moves to step #117 where it is determined whether a predetermined period of time has passed (is or longer period of time) from the stop of the focal point adjustment in step #112 or step #119 or not. If so, the processing moves to step #118 where a different subject is determined as the subject to be captured by the photographer, and the lens is driven by the amount of defocus acquired by the focal point detection from the latest focal point detection result. If the predetermined period of time has not passed, the processing moves to step #119 where the focal point adjustment is stopped.

After that, the operations from step #102 to step #119 are repeated until the switch SW1 is turned off.

According to this embodiment, an imaging lens may be allowed to track a subject, and an image in focus may be acquired as far as it is determined that the subject is being captured even when a photographer is performing a fast panning operation.

Having described an embodiment of the present invention, the present invention is not limited to the embodiment, and various modifications and changes may be made without departing from the spirit and scope of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-038560, filed on Feb. 24, 2011 which is hereby incorporated by reference herein its entirety.

What is claimed is:

1. An image pickup apparatus comprising:
   a focal point detecting unit which detects a focal point state of an imaging lens;
   an adjusting unit which performs a focal point adjustment operation on the imaging lens in accordance with the focal point state;

a panning detecting unit which detects a panning state; and a controller which changes the focal point adjustment operation by the adjusting unit in accordance with the panning state detected by the panning detecting unit and the focal point state detected by the focal point detecting unit, wherein the focal point state is related to information about whether an amount of change of the focal point state is lower than a predetermined amount.

2. The image pickup apparatus according to claim 1, wherein the controller changes the focal point adjustment operation by the adjusting unit if an amount of panning of the panning state detected by the panning detecting unit is equal to or larger than a predetermined amount and a time period of the panning state detected by the panning detecting unit is equal to or higher than a predetermined period of time.

3. The image pickup apparatus according to claim 1, wherein the focal point detecting unit detects the focal point state of the imaging lens based on a change in image surface positions of a subject, and wherein the controller changes the focal point adjustment operation by the adjusting unit if a dispersion value of the image surface positions is lower than a predetermined value.

4. The image pickup apparatus according to claim 1, wherein the focal point detecting unit detects the focal point state of the imaging lens based on a change in image surface positions of a subject, and wherein the controller changes the focal point adjustment operation by the adjusting unit if the amount of change in image surface of the image surface position is lower than a predetermined value.

5. The image pickup apparatus according to claim 1, wherein the focal point detecting unit detects the focal point state of the imaging lens based on a change in image surface positions of a subject, and wherein the focal point adjusting unit uses a predictive autofocusing result to perform focal point adjustment if the amount of change in an image surface of the image surface position is equal to or higher than a predetermined value and uses the latest focal point detection result to perform focal point adjustment if the image surface position has not changed by a predetermined value or higher.

6. The image pickup apparatus according to claim 1, wherein, when focal point adjustment is stopped, the adjusting unit uses the latest focal point detection result to perform focal point adjustment if a predetermined period of time has passed from the stop of the focal point adjustment.

7. The image pickup apparatus according to claim 1, wherein the panning detecting unit detects a panning state of the imaging lens based on an output signal from a sensor in the imaging lens.

8. The image pickup apparatus according to claim 1, wherein the panning detecting unit detects a panning state based on an output from a sensor in the image pickup apparatus.

9. A control method for an image pickup apparatus, the method comprising:

a focal point detecting step in which a focal point state of an imaging lens is detected;

an adjusting step in which a focal point adjustment operation is performed on the imaging lens in accordance with the focal point state;

a panning detecting step in which a panning state is detected; and a control step in which a controller changes the focal point adjustment operation in accordance with the panning state detected at the panning detecting step and the focal point state detected at the focal point detecting step, wherein the focal point state is related to information about whether an amount of change of the focal point state is lower than a predetermined amount.

\* \* \* \* \*